United States Patent
Tsukamoto et al.

(10) Patent No.: US 9,864,436 B2
(45) Date of Patent: Jan. 9, 2018

(54) METHOD FOR RECOGNIZING MOTION GESTURE COMMANDS

(71) Applicant: LENOVO (SINGAPORE) PTE. LTD., Singapore (SG)

(72) Inventors: Yasushi Tsukamoto, Kanagawa-ken (JP); Jun Sugiyama, Kanagawa-ken (JP)

(73) Assignee: LENOVO (SINGAPORE) PTE LTD, Singapore (SG)

(*) Notice: Subject to any disclaimer, the term of this patent is extended or adjusted under 35 U.S.C. 154(b) by 0 days.

(21) Appl. No.: 15/582,338

(22) Filed: Apr. 28, 2017

(65) Prior Publication Data

US 2017/0308174 A1    Oct. 26, 2017

Related U.S. Application Data

(62) Division of application No. 14/171,029, filed on Feb. 3, 2014, now abandoned.

(30) Foreign Application Priority Data

Mar. 11, 2013 (JP) .................................. 2013-047459

(51) Int. Cl.
  *G06F 3/01* (2006.01)
  *G06K 9/00* (2006.01)

(52) U.S. Cl.
  CPC ......... *G06F 3/017* (2013.01); *G06K 9/00355* (2013.01)

(58) Field of Classification Search
  CPC ............. G06K 9/00335–9/00355; G06F 3/017
  See application file for complete search history.

(56) References Cited

U.S. PATENT DOCUMENTS

| 8,891,868 B1* | 11/2014 | Ivanchenko | G06F 3/017 382/168 |
| 2010/0046796 A1* | 2/2010 | Pietquin | G06K 9/00335 382/103 |
| 2013/0329948 A1* | 12/2013 | Minagawa | G06T 7/004 382/103 |

OTHER PUBLICATIONS

Bobick, Aaron F., and James W. Davis. "The recognition of human movement using temporal templates." IEEE Transactions on pattern analysis and machine intelligence 23.3 (2001): 257-267.*

* cited by examiner

*Primary Examiner* — Stephen R Koziol
*Assistant Examiner* — Raphael Schwartz
(74) *Attorney, Agent, or Firm* — Russell Ng PLLC; Anthony P. Ng (57) ABSTRACT

A computer capable of recognizing gesture commands is disclosed. Suppose that a user makes a gesture of swinging a hand from side to side in front of a camera associated with a computer. A camera module receives frames with shots of the gesture in order. The camera module calculates a gradation difference between corresponding pixels of each frame and a background image to generate a set of binarized differential images. The camera module then combines differential images to generate composite images. In response to a determination that any of the composite images matches a reference pattern, the camera module outputs a computer command. The computer command can be used to control the power state of the computer or start a specific application within the computer.

6 Claims, 9 Drawing Sheets

METHOD FOR RECOGNIZING MOTION GESTURE COMMANDS

PRIORITY CLAIM

The present application claims benefit of priority under 35 U.S.C. §§120, 365 to the previously filed Japanese Patent Application No. JP2013-047459 with a priority date of Mar. 11, 2013, which is incorporated by reference herein.

BACKGROUND OF THE INVENTION

1. Technical Field

The present invention relates to gesture commands in general, and particularly to a method for recognizing motion gesture commands for controlling computer operations.

2. Description of Related Art

A desktop computer, a laptop computer (laptop PC), a tablet computer, or a smartphone is commonly equipped with a web camera capable of projecting real-time video on a monitor to enable a user to make a video phone call or to take a photograph or a video.

One prior art discloses a method for recognizing a motion pattern of a person from the parameters of a motion blur taken with a camera. For example, the extent of the motion blur can be utilized as an indicator to indicate the speed of an object. In addition, the trajectory of the object can be obtained from variations in the direction of the motion blur. Furthermore, the motion blur is associated with a gesture.

Another prior art discloses a method for detecting a moving object with high accuracy even when a photographing environment changes in terms of the brightness of an object or when the pictures is taken during a camera shake. The moving object can be detected from a differential image corresponding to a density difference between a first image and a second image input immediately before the first image.

SUMMARY OF THE INVENTION

In accordance with a preferred embodiment of the present invention, a reference pattern is initially defined. A frame is subsequently received from an image sensor that has captured a blurred image of an object. The shape of the blurred image included in the received frame is identified. The reference pattern are then comparing to the identified shape of the blurred image to determine whether or not the identified shape represents a gesture command. In response to a determination that the identified shape represents a gesture command, a corresponding command for controlling an operation of a computer is generated.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Hardware Configuration of Laptop PC

Figure 1:
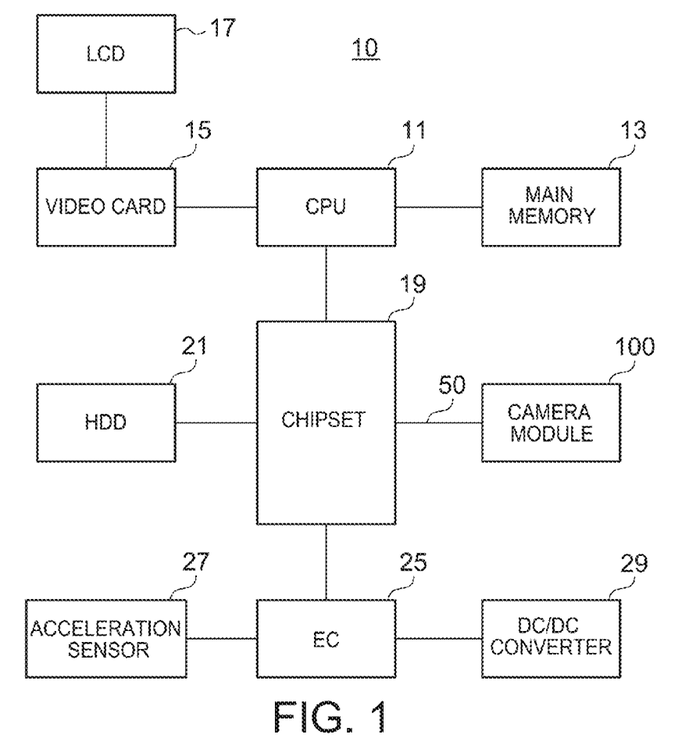
FIG. 1 is a block diagram of a laptop PC.

FIG. 1 is a block diagram of a camera system 10 implemented in a laptop PC. A CPU 11 incorporates a memory controller and a PCI Express controller. The CPU 11 is connected to a main memory 13, a video card 15, and a chipset 19. An LCD 17 is connected to the video card 15. The chipset 19 incorporates controllers, such as SATA, USB, PCI Express, and LPC, and also incorporates Real-Time Clock (RTC). An HDD 21 is connected to the SATA controller. The USB controller is configured to include multiple hubs that make up a USB host controller, a root hub, and I/O ports.

A camera module 100 is a USB device conforming to USB2.0 or USB3.0 standards. The camera module 100 is connected to a USB port of the USB controller through a pair or three pairs of USB buses 50 to transfer data using a differential signal. The USB port to which the camera module 100 is connected may share a hub with another USB device. However, it is preferred that the USB port be connected to a hub dedicated to the camera module 100 to control the power of the camera module 100 effectively using a selective suspend mechanism of a USB system.

Here, in the selective suspend of the USB system, when a USB client driver determines that a USB device is idle, a request packet is sent to a USB bus driver. When all USB devices connected to the USB hub become idle, the USB bus driver makes USB buses connected to the USB hub transit to an idle state, and USB devices that have detected the state transition of the buses transit to the selective suspend state. Therefore, as the camera module 100 stays in the idle state for a longer period of time, the period for which the USB buses stay in the idle state becomes longer, and as a result, the period of the transition of the camera module 100 to the selective suspend state becomes longer.

The camera module 100 may be of the type of being incorporated in the housing of the laptop PC or an external type module that is connected to a USB connector mounted in the housing of the laptop PC. The camera module 100 may also be connected to the laptop PC by wireless USB. The camera system 10 according to the present invention can transfer image data in a gesture mode introduced by the present invention in addition to a conventional video mode for taking a video. The gesture mode is a transfer mode used by the gesture recognition application 201 in FIG. 3 to acquire frames in order to recognize a gesture.

In the gesture mode, the camera module 100 transfers frames at a frame rate lower than the video mode to increase the exposure time so that each frame can capture a motion blur of the gesture. Here, the frame corresponds to one still image unit in image data composed of all horizontal lines. In an interlaced system, one frame is composed of two fields. The details of the gesture mode will be described later.

In addition to the video mode and the gesture mode, the camera module 100 also operates in a monitoring mode for checking an image upon taking a still image. In the monitoring mode, the number of pixels in a frame can be reduced compared to that in the video mode. The hardware of the laptop PC 10 such as the CPU 11, the chipset 19, and the main memory 13, and software such as the gesture recognition application 201 shown in FIG. 3, respective layers of device drivers 207, 209, 211, and 213, a still image transfer service 203, and an operating system 205 are the main components of the camera system 10.

An EC 25 is a microcontroller for controlling temperature inside the housing of the computer 10 and controlling the power of devices. The EC 25 operates independently of the CPU 11. An acceleration sensor 27 and a DC/DC converter 29 are connected to the EC 25, and a keyboard, a mouse, a charger, an exhaust fan, and the like, which are not shown, are also connected to the EC 25. A battery or an AC/DC adapter, not shown, supplies power to the DC/DC converter 29. The DC/DC converter 29 supplies power to the devices that make up the computer 10.

B. Camera Module

Figure 2:
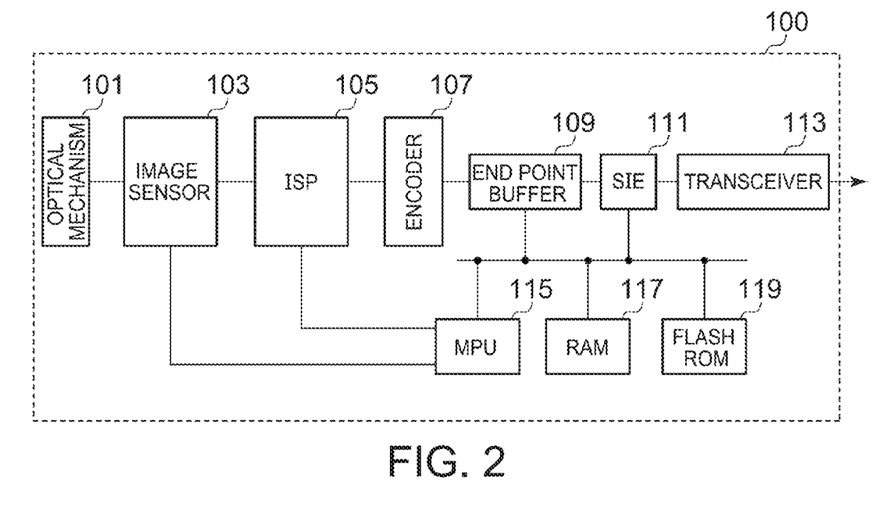
FIG. 2 is a block diagram of a camera system within the laptop PC from FIG. 1.
Figure 3:
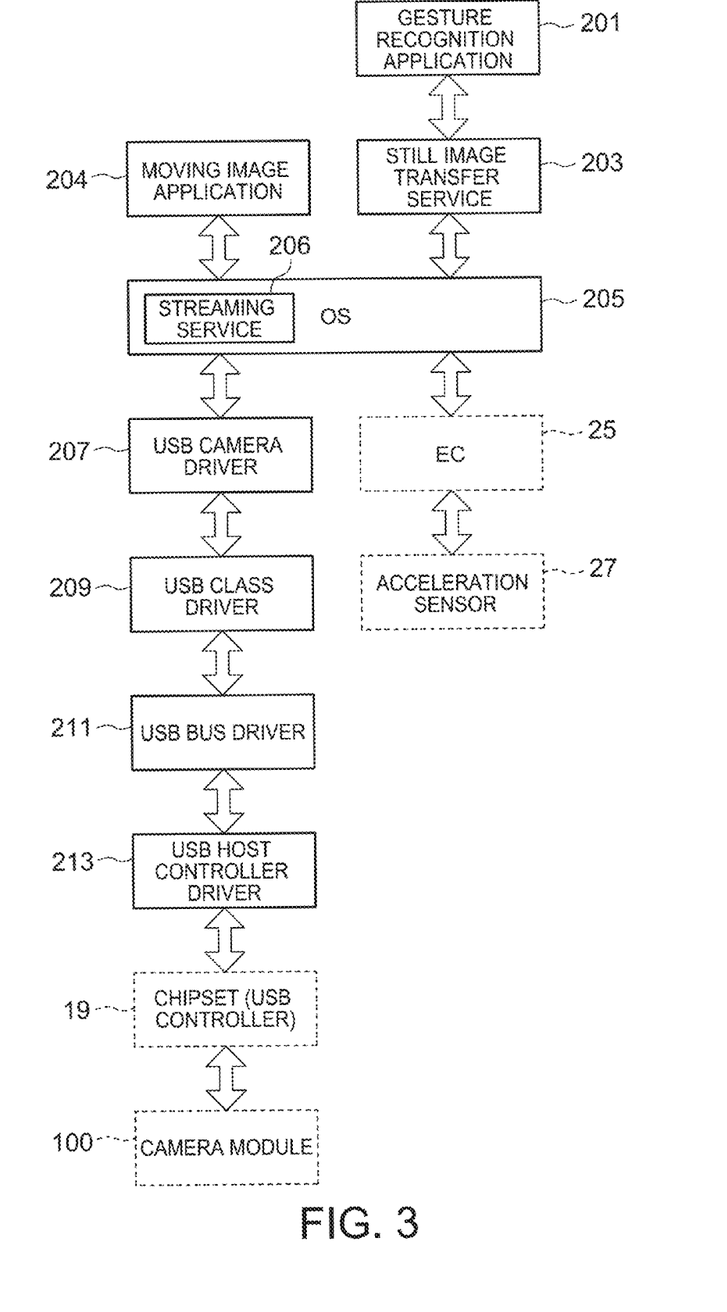
FIG. 3 is a block diagram depicting the software configuration of the camera system from FIG. 2.

FIG. 2 is a detailed block diagram of the camera module 100. FIG. 3 is a block diagram depicting the software configuration of the camera system 10. In the gesture mode, the camera module 100 can transfer frames having a screen resolution (number of pixels) such as VGA (640×480), QVGA (320×240), WVGA (800×480), or WQVGA (400×240). An optical mechanism 101 is made up of an optical lens, an optical filter, and the like to focus the image of a subject onto an image sensor 103.

The image sensor 103 is made up of a CMOS image sensor for converting, to an electric signal, an electric charge corresponding to the amount of light accumulated in a photodiode that forms part of a pixel, and outputting the electric signal, a CDS circuit for reducing noise, an AGC circuit for adjusting gain, an AD conversion circuit for converting an analog signal to a digital signal, and the like. The image sensor 103 outputs a digital signal corresponding to the brightness of the subject image. When operating in the video mode, the image sensor 103 can transfer image data at a frame rate of 30 fps.

The CMOS image sensor includes an electronic shutter called a rolling shutter. The rolling shutter uses one line or a few lines as one block unless otherwise specified by the system to control the exposure time so that the exposure time will become best for the photographing environment. During one frame period, or in the case of an interlaced system, the rolling shutter rests, in the process of photographing, a signal charge accumulated during one field period in the photodiode that forms part of each pixel to control the exposure time. Note that the image sensor 103 can also use a CCD image sensor instead of the CMOS image sensor.

An image signal processor (ISP) 105 is an image signal processing circuit for performing processing, such as correction processing for correcting a defective pixel and shading, white balance processing for correcting the spectral characteristics of the image sensor 103 according to the human visibility, interpolation processing for outputting common RGB data from signals of an RGB Bayer array, color correction processing for approximating the spectral characteristics of color filters in the image sensor 103 to ideal characteristics, and the like. The ISP 105 further performs processing, such as contour correction processing for increasing the sense of resolution of the subject, gamma processing for correcting the non-linear input/output characteristics of the LCD 17, and the like.

An encoder 107 compresses image data received from the ISP 105. An end point buffer 109 temporarily stores data to be transferred with the system bi-directionally to form multiple pipes for USB transfer. A serial interface engine (SIE) 111 packetizes image data received from the end point buffer 109 to meet the USB standards and sends the packetized image data to a transceiver 113, or analyzes a packet received from the transceiver 113 and sends a payload to an MPU 115.

When a USB bus 50 is in the idle state for more than a predetermined period of time, the SIE 111 interrupts the MPU 115 to make the USB bus 50 transit to the selective suspend state. Then, the SIE 111 operates the MPU 115 suspended when the USB bus 50 is resumed. The transceiver 113 includes a transmission transceiver and a reception transceiver for USB communication. The MPU 115 performs enumeration for USB transfer, and controls the operation of the camera module 100 for further taking an image and transferring image data. The camera module 100 conforms to the power management specified in the USB standards. When interrupted by the SIE 111, the MPU 115 can disrupt an internal clock to make the camera module 100 including itself transit to the suspended state.

The MPU 115 can return the camera module 100 to the power-on state or a photographing state when the USB bus 50 is resumed. The MPU 115 interprets a command received from the system to control the operation of each component in order to transfer image data in the video mode (including the monitoring mode) or the gesture mode. When the USB bus 50 is in the idle state upon transferring frames in the gesture mode, the MPU 115 sends a resume signal to the USB bus driver 211 to release the idle state.

When sending the MPU 115 a command for enabling the gesture mode, the gesture recognition application 201 can specify various parameters to set an exposure time. In one method, the gesture recognition application 201 specifies only the frame rate for transferring still images to the camera module 100. After performing calibration, such as the exposure time of the rolling shutter, the white balance, and the gain of the AGC circuit, the MPU 115 sets the maximum exposure time available for the current photographing conditions on the frame rate specified.

The MPU 115 further sets, in the image sensor 103 and a predetermined register in the ISP 105, other parameters to be optimized for the current photographing conditions on the set exposure time. In another method, the gesture recognition application 201 specifies several parameters that affect the taking of a blurred image, such as exposure time, ACG gain, gamma curve, contrast, and aperture value. The MPU 115 sets other parameters to be optimized for the current photographing conditions on the specified parameters. When an exposure time is specified, the MPU 115 can set a frame rate according to the exposure time.

Figure 4A:
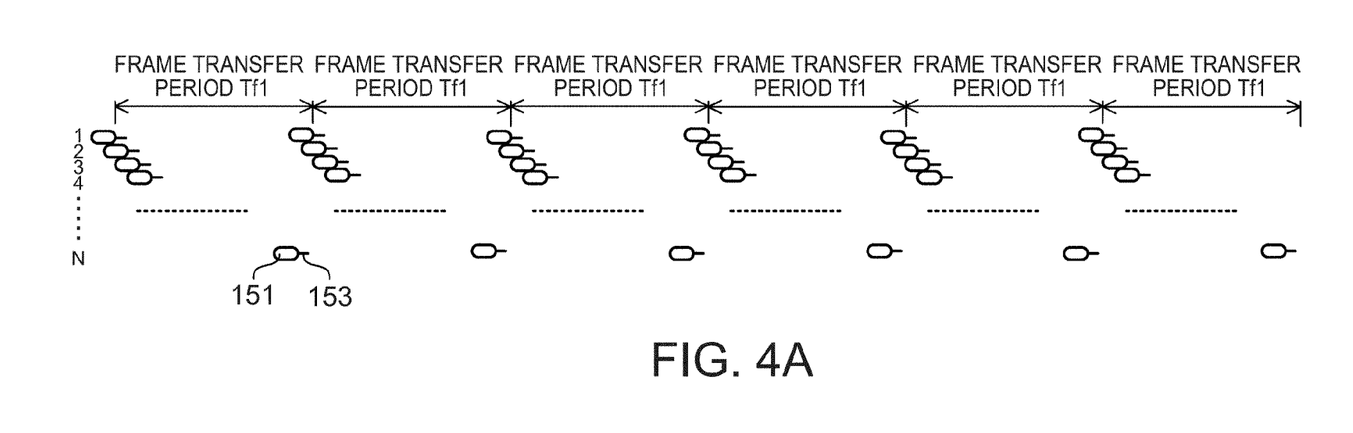
FIGS. 4A-4B are diagrams depicting a relationship between frame rate and exposure time.
Figure 4B:
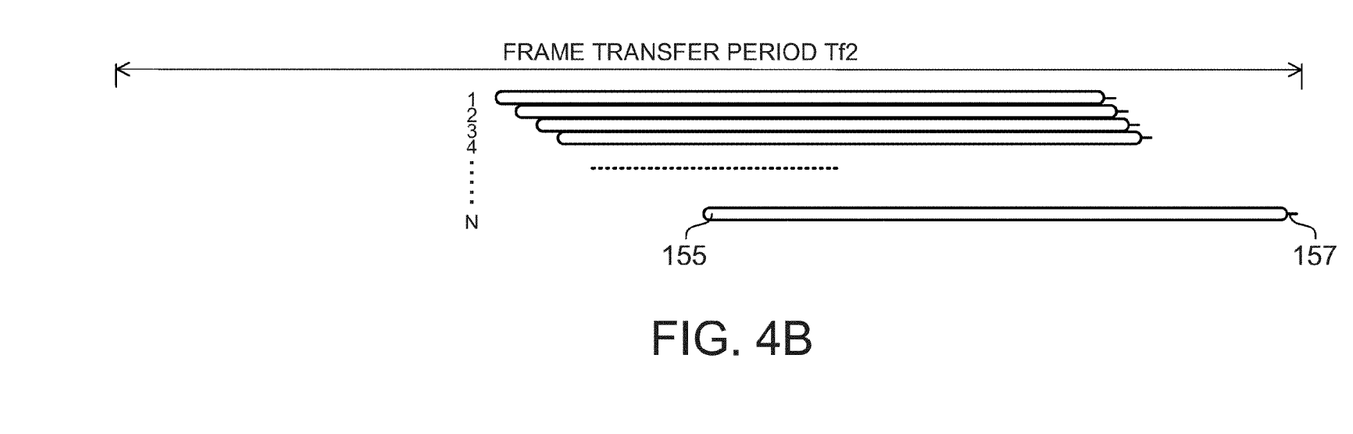

The situation will be described with reference to FIGS. 4A and 4B. FIG. 4A shows a state of transferring image data at a frame rate F1 of 30 fps in the video mode, and FIG. 4B shows a state of transferring image data at a frame rate F2 of 5 fps as an example in the gesture mode. Here, a description will be made by taking a non-interlaced system as an example, but the present invention may also employ a camera module for outputting image data in an interlaced system.

In FIG. 4A, first to N lines are scanned sequentially in each frame transfer period Tf1 (1/F1) to output data. The time required for each line is composed of an exposure time 151 and a reading time 153. In FIG. 4B, first to N lines are scanned sequentially in a frame transfer period Tf2 (1/F2) to output data. Each line is composed of an exposure time 155 and a reading time 153.

When the frame rate F2 is ⅙ of F1 and the frame transfer period Tf2 is sixfold, the exposure time can be prolonged up to about sixfold. The longer the exposure time, the larger the area of a blurred image when a moving object is shot. As will be described later, the area of the blurred image corresponds to the amount of information used for pattern recognition. Here, the blurred image is an image formed by the contour of the moving object shot in one frame. The gesture recognition application 201 identifies the shape of the blurred image from the contour of the blurred image. In the embodiment, the moving object is an arm of a person who makes a gesture as an example, but the present invention is not limited thereto. The moving object can be any other object such as a moving machine or natural object.

In the gesture mode, the camera module 100 transits to the selective suspend state when no frame is transferred, and this may result in loss of the set parameters. The MPU 115 can also store, in a flash ROM 119, the parameters set once, and set the parameters by reading them from the flash ROM 119 in each frame transfer period. The flash ROM stores a program executed by the MPU 115. The MPU 115 can interpret a command received from the system to operate the camera module 100 in the gesture mode or the video mode.

The camera module 100 is a bus-powered device that operates by receiving the supply of power from the USB bus 50. In this regard, however, the camera module 100 may also be a self-powered device that operates with power supplied by itself. In the case of a self-powered device, the MPU 115 controls the power supplied independently to follow the state of the USB bus 50.

The camera module 100 transits between the selective suspend state and the power-on state based on the USB standards. The camera module 100 may transit to two or more low-power states during the period of the selective suspend state. When operating in the gesture mode, if the frame transfer period is long, the camera module 100 can operate only the image sensor 103 during a period of sending no frame to transit to a low-power state with least power consumption.

Note that FIGS. 1 and 2 simply show the main hardware configuration and connection relations associated with the embodiment in a simplified manner to describe the embodiment. In addition to those mentioned thus far, many other devices are used to make up the camera system 10. However, since these devices are known to those skilled in the art, the description thereof will not be given in detail here. The present invention contains a configuration in which multiple blocks shown in the figure are formed as one integrated circuit or device, and conversely, a configuration in which one block is divided into multiple integrated circuits or devices as long as an arbitrary selection can be made by those skilled in the art. For example, the interface of the camera module 100 may be configured as a Mobile Industry Processor Interface (MIPI) and the system may be configured as a system-on-a-chip (SOC).

C. Software Configuration of Camera System

Software shown in FIG. 3 is stored in the HDD 21, loaded into the main memory 13, and executed by the CPU 11. A moving image application 204 is a known program for acquiring video data from the camera module 100 to display the video on the LCD 17 or recording it in the HDD 21. The moving image application 204 can be a video-phone program or a moving image shooting program. The moving image application 204 can also be a gesture engine for performing sophisticated recognition of a gesture by a conventional method.

The gesture recognition application 201 is a novel program for acquiring a frame sequence from the camera module 100 in the gesture mode, performing pattern recognition of a blurred image, and outputting a command corresponding to the recognized gesture. Note that the frame sequence means a frame group of continuous still images transferred at a frame rate low enough to produce pictures unnatural as video data. As an example, the power state of the laptop PC 10 can be controlled or the moving image application 204 can be started by the command output from the gesture recognition application 201.

The gesture recognition application 201 can include a user interface for allowing a user to set parameters of the camera system 10 to be applied to the gesture mode, set the gesture mode to enabled, and the like. The gesture recognition application 201 may be executed only when the laptop PC is receiving the supply of power from the AC/DC adapter. Since the camera system 10 operates with low power consumption, this is particularly suitable for operating the camera system 10 while power is being supplied from a battery pack.

A streaming service 206 is a service program provided by the OS 205 to send frames to the moving image application 204 in the video mode or the monitoring mode, and pass, to the USB camera driver 207, a command issued by the moving image application 204. A still image transfer service 203 is a program that runs in a user mode of the OS 205 to send the gesture recognition application 201 a frame sequence transferred in the gesture mode, and send the USB camera driver 207 a command and parameters received from the gesture recognition application 201.

The USB camera driver 207 is a device driver for controlling the operation of the camera module 100 and controlling data transfer. The USB class driver 209 is a device driver for performing common processing defined in the USB video class. The USB bus driver 211 controls the operation of the USB buses connected to the USB controller. When receiving an instruction from the USB camera driver 207 to make a transition of the camera module 100 to selective suspend, the USB bus driver 211 makes the USB bus 50 connected to the camera module 100 transit to the idle state, while when receiving an instruction to resume the USB bus 50 or an instruction for data transfer, the USB bus driver 211 makes the USB bus transit to an active state (resumed state). The USB host controller driver 213 controls data transfer to the camera module 100 and the operation of the USB host controller.

D. Gesture Recognition Application

Figure 5:
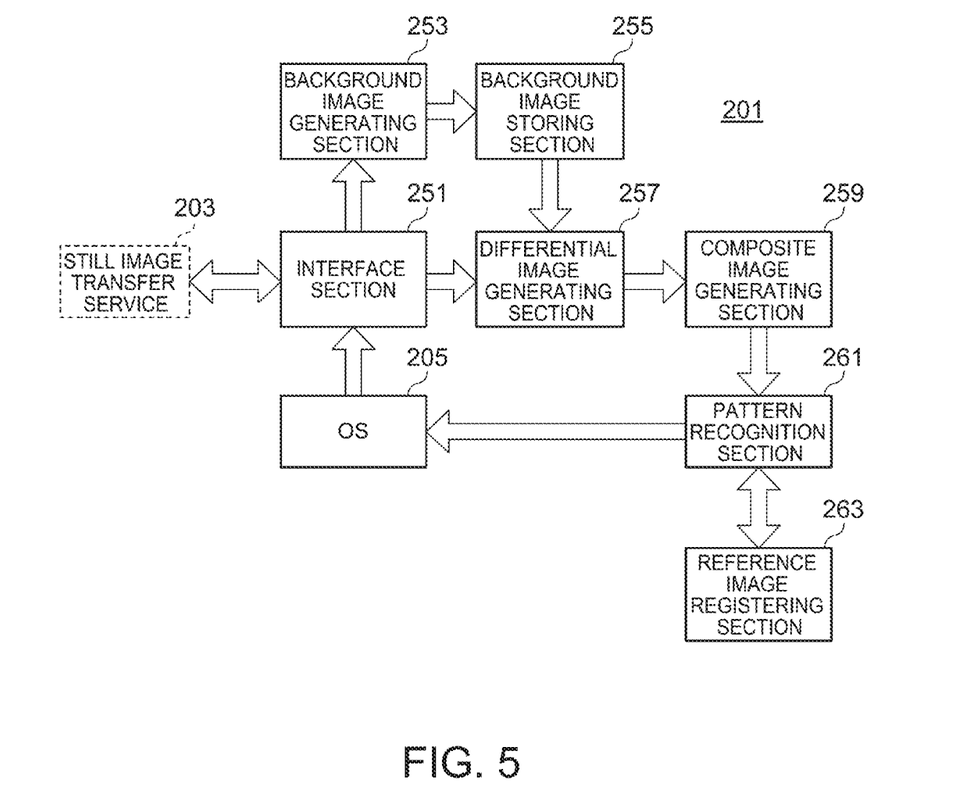
FIG. 5 is a block diagram depicting the configuration of a gesture recognition application.

FIG. 5 is a block diagram depicting the configuration of the gesture recognition application 201. An interface section 251 sends a differential image generating section 257 frames received from the still image transfer service 203 sequentially in the gesture mode. When the acceleration value detected by the acceleration sensor 27 is lowered to a value less than or equal to a predetermined value after exceeding the predetermined value, the OS 205 gives a notification indicating that the background image to be taken with the camera module 100 has changed due to a change in the position of the laptop PC.

The interface section 251 that received the notification stores, in a background image storing section 255, multiple frames received from the still image transfer service 203. In addition to this, the interface section 251 acquires multiple frames periodically in the gesture mode and stores the acquired frames in the background image storing section 255. The interface section 251 sends the still image transfer service 203 parameters set by the user, such as enable/disable setting of the gesture mode, frame rate, exposure time, contrast, and AGC gain.

A background image generating section 253 generates a background image from the frames received from the interface section 251. When a moving object is shot, still images taken in the gesture mode contain a blurred image. The background image generating section 253 calculates and binarizes a difference between gradation values of corresponding pixels of received multiple frames possible to include the blurred image to identify the blurred image. The background image generating section 253 calculates a logical sum of multiple background images except the blurred image identified from the frames, generates a background image without including the blurred image, and stores the background image in the background image storing section 255.

The differential image generating section 257 calculates a gradation difference between corresponding pixels of the frame received from the interface section 251 and the frame of the background image received from the background image storing section 255, generates a binarized differential image, and sends the differential image to a composite image generating section 259. The composite image generating section 259 that received the differential image calculates a logical sum to combine differential images in order to generate a composite image, and sends the composite image to a pattern recognition section 261. A reference image registering section 265 registers multiple reference patterns associated with predetermined commands.

The pattern recognition section 261 extracts, using a known algorithm, the features of the composite image generated by the composite image generating section 259, and compares the composite image with the multiple reference patterns registered in the reference image registering section 263. When determining that the composite image matches either of the reference patterns, the pattern recognition section 261 outputs, to the OS 205, a command associated with the reference pattern. Each component shown in FIG. 5 is a hardware component that cooperates with hardware such as the CPU 11 and the main memory 13 to provide the laptop PC with a specific function.

E. Gesture Recognition Procedure

Figure 6:
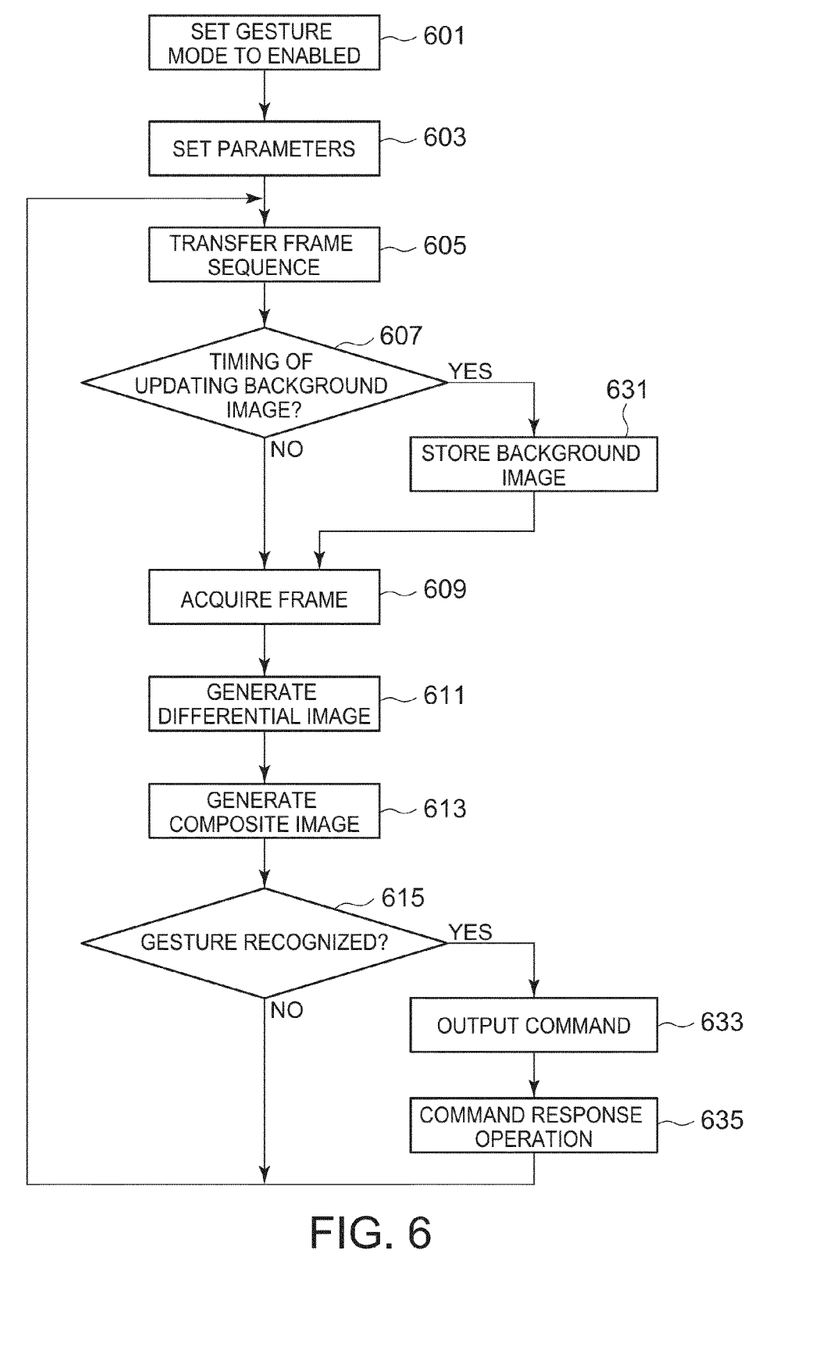
FIG. 6 is a flowchart of a procedure through which the camera system from FIG. 2 recognizes a gesture.
Figure 7A:
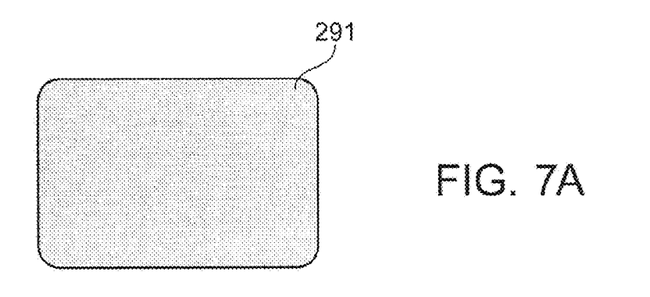
FIGS. 7A-7B are diagrams abstractly depicting a state of a background image and a person present in the foreground, who swings an arm in a cyclic way.
Figure 7B:
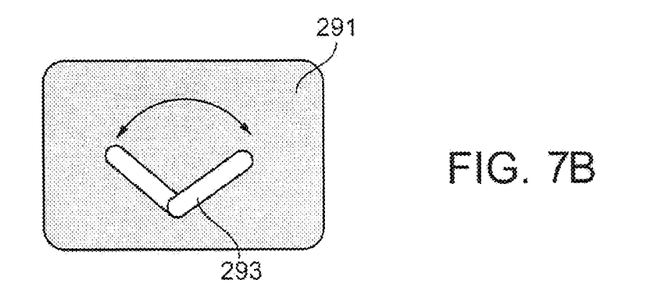
Figure 8A:
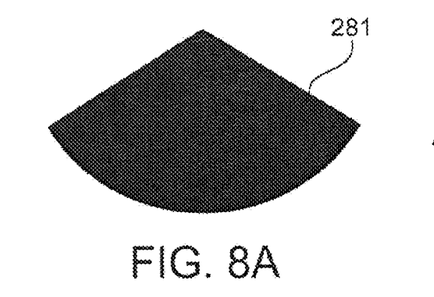
FIGS. 8A-8D are diagrams depicting the shapes of reference patterns registered in a reference image registering section.

Next, a procedure for recognizing a gesture by a simple method according to the embodiment to enable the camera system 10 to activate a gesture engine for performing sophisticated gesture recognition requiring large power consumption will be described with reference to a flowchart of FIG. 6. FIG. 7 abstractly shows a state of a background image 291 and a person present in the foreground, who swings an arm 293 in a cyclic way as an example of the moving object that generates a blurred image. FIG. 8A-8D show the shapes of reference patterns registered in the reference image registering section 263. FIG. 8A corresponds to a reference pattern of a blurred image in which a person facing a camera swings the arm 293 from side to side with the arm down using a shoulder as a pivot point.

Figure 8B:
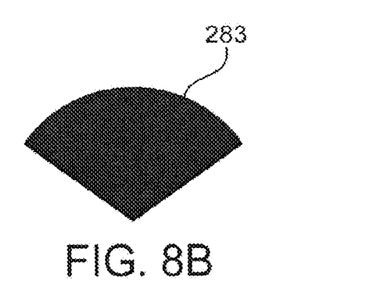
Figure 8C:
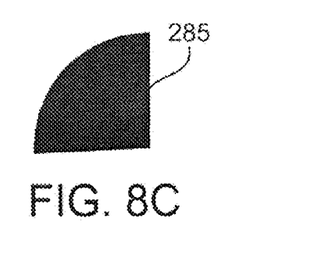
Figure 8D:
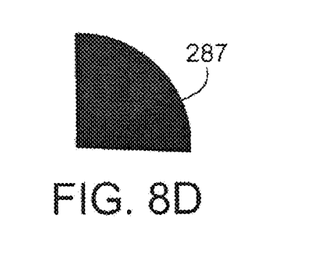
Figure 9:
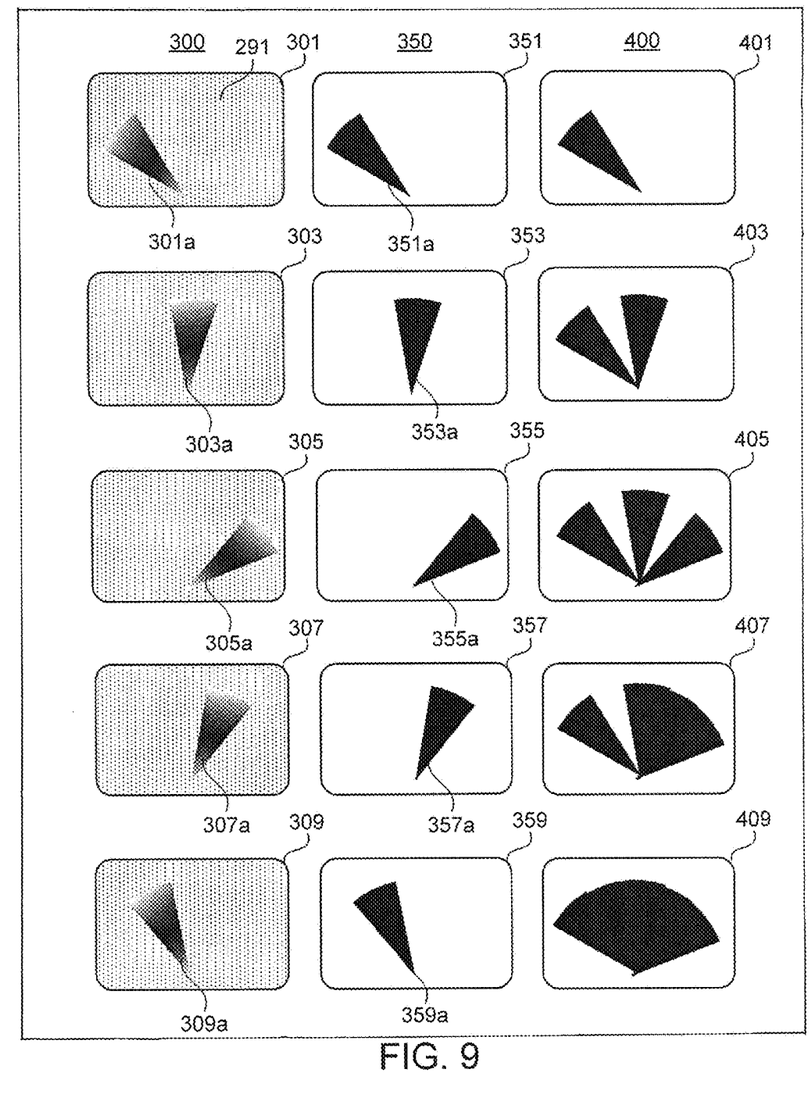
FIG. 9 is a diagram depicting an example of generating a differential image group and a composite image group from a background image and a frame sequence.

FIG. 8B corresponds to a reference pattern of a blurred image in which the person facing the camera swings the arm 293 from side to side toward the camera module 100, where the arm extends forward with the elbow bent. FIGS. 8C and 8D correspond to reference patterns of blurred images in each of which the person with the face turned to the left side or right side of the camera module 100 swings the arm back and forth toward himself or herself, where the arm extends forward with the elbow bent. FIG. 9 is an example of generating a differential image group 350 and a composite image group 400 from the background image 291 and a frame sequence 300.

In block 601, the interface section 251 sends the camera module 100 a command for enabling the gesture mode and a parameter associated with the exposure time. In block 603, the camera module 100 shifts into the gesture mode and sets the specified parameter and other appropriate parameters. In block 605, the camera module 100 sets the frame rate, for example, to 5 fps to set the exposure time to the maximum value available in the range in order to start the transfer of the shot frame sequence 300.

The user makes a gesture toward the camera module 100 at proper timing. Since the timing of starting the gesture is not synchronized with the timing of transferring frames, taking images of the gesture is started at any time with respect to the frame transfer period. In block 607, at the timing of updating the background image, the procedure shifts to block 631. The timing of updating the background image comes when the acceleration sensor 27 detects the movement of the laptop PC or in predetermined regular periods. In block 631, the background image generating section 253 stores, in the background image storing section 255, multiple frames newly generated.

In block 609, the differential image generating section 257 receives frames 301 to 309 constituting the frame sequence 300 in order. The frames 301 to 309 are images of a gesture taken when the user extends the arm forward in front of the camera and moves the arm once from right to left using the elbow as a pivot point. When the exposure time is set properly for the cycle of the gesture, each frame contains each of blurred images 301a to 309a corresponding to the motion of the arm that makes the gesture. The differential image generating section 257 calculates gradation differences of each of the frames 301 to 309 from corresponding pixels of the latest background image stored in the background image storing section 255 at that point to generate binarized differential images 351 to 359.

The calculated gradation differences show large values for pixels the representation of which are changing like the blurred images 301a to 309a and small values for pixels to represent the background image 291 with no change. Therefore, before taking the images of the gesture, since the interface section 251 receives only the background image 291, the gradation of differential images take meaninglessly small values on most of the pixels.

The differential image generating section 257 sets a fixed threshold value for each pixel for which a gradation difference is calculated to binarize the gradation of each pixel. For example, the differential image generating section 257 sets logical value 1 for pixels that exceed the threshold value and logical value 0 for pixels less than the threshold value. The background image 291 is removed from the differential images 351 to 359, and the blurred images 301a to 309a are converted to binarized differential images 351a to 359a.

The differential image generating section 257 sends the differential images 351 to 359 to the composite image generating section 259. The differential images 351 to 359 also contain blurred images (noise blur) as noise caused when the frames 301 to 309 are shot along with the motion of any other object unrelated to the gesture. The noise blur reduces the accuracy of pattern recognition. However, since the reference patterns 281 to 287 have relatively simple shapes distinguishable from the noise blur, the influence thereof is eliminated in the process of pattern recognition. The differential image generating section 257 generates each of the differential images 351 to 359 and sends the generated differential image to the composite image generating section 259 each time the differential image generating section 257 receives each of the frames 301 to 309 in the return path from block 615 to block 605 until the gesture is recognized.

In block 613, the composite image generating section 259 calculates a logical sum of logical values set for each pixel of the received one of the differential images 351 to 359 and each pixel of the differential image last received to generate the composite image group 400. Since an image with which the differential image 351 is calculated to obtain the logical sum does not contain any binarized blurred image, the differential image 351 is exactly the same as a composite image 401. After generating the composite image 401, the composite image generating section 259 calculates a logical sum of the differential image 353 next received and the composite image 401 last generated to generate a new composite image 403. Then, each of composite images 405 to 409 is generated each time each of the differential images 355 to 357 is added to increase the amount of information on blurred images 301a to 309a, approaching the shape of a reference pattern 283.

The composite image 409 has a shape almost close to the shape of the reference pattern 283. In block 615, the pattern recognition section 261 compares, using a known algorithm, the features of a composite image with each of the reference patterns 281 to 287 each time each of the composite images 401 to 409 is received. The features can include, for example, the direction of being opened into a fan shape, and the center angle or the area. Since the reference patterns 281 to 287 are relatively simple patterns, the load on the CPU 11 that performs pattern recognition can be reduced.

The pattern recognition section 261 can also complement portions missing in the composite image 405 or 407 to determine that the gesture matches the reference pattern 283. When determining that any of the composite images 401 to 409 matches either of the reference patterns 281 to 287, the pattern recognition section 261 sends the OS 205 a command associated with the reference pattern in block 633. In block 635, the OS 205 activates the gesture engine that performs sophisticated processing for manipulating the laptop PC.

Returning from block 635 to block 605, the interface section 251 further receives a frame sequence. Immediately after a command is output, since the composite images that have been generated until then remain in the composite image generating section 259, there is a need to exclude the composite images from recognition targets. The pattern recognition section 261 can ignore a predetermined number of composite images generated after the command is output. After that, the pattern recognition section 261 starts the recognition of a new gesture again at the time of receiving a composite image without the influence of the binarized blurred images as the basis for outputting the previous command. In the gesture mode, since the exposure time is made long intentionally, a gesture can be recognized without being affected by photographing environments ranging from bright places to dark places.

Figure 10:
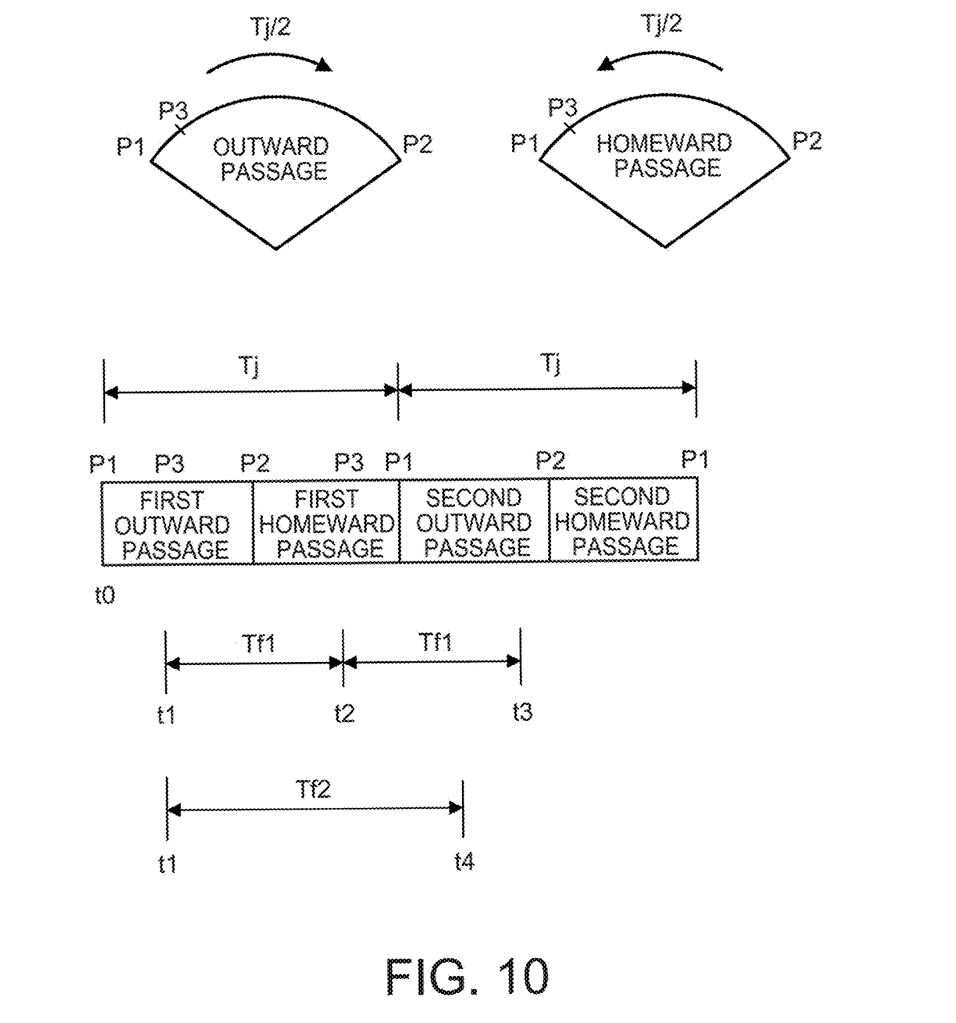
FIG. 10 is a diagram depicting a relationship between frame transfer period Tf and gesture cycle Tj.

The recognition target in the present invention is the shape formed by the entire contour of a blurred image. Although the speed of the gesture and the exposure time do not affect the shape of the contour directly, when they are selected properly, it is advantageous in terms of the number of times of a gesture required to recognize the gesture, the recognition time, the power consumption, and photographing in darkness. FIG. 10 is a diagram for describing a relationship between frame transfer period Tf and gesture cycle Tj.

Suppose that the gesture is the motion of an arm swinging from position P1 to position P2 in the outward passage and swinging from position P2 to position P1 in the homeward passage. In this case, if it is assumed that the frame transfer period Tf as the reciprocal of the frame rate F is almost equal to the exposure time, the amount of information usable for comparison with the reference pattern of a blurred image included in one frame increases as the frame transfer period Tf is lengthened. However, the longer the frame transfer period Tf, the longer the time from the start of the gesture until the gesture recognition application 201 acquires the first frame, resulting in a delay in the recognition of the gesture.

It can be said that a blurred image the inside of which is filled over the entire part of the outward passage (from position P1 to position P2) or the homeward passage (from position P2 to position P1) of the gesture is an adequate amount of information necessary for comparison with the reference pattern. However, when a complementary method is employed or the number of reference patterns is small, the recognition can be performed accurately without necessarily providing such an amount of information. When information other than the information already obtained in the outward passage or the homeward passage cannot be obtained even if the frame transfer period Tf is set longer, an upper limit can be set to the frame transfer period Tf because only a delay is caused.

Here, the upper limit of the frame transfer period Tf can be defined as the minimum time capable of obtaining an adequate amount of information usable for recognition. Note that the time t0 for starting the gesture cannot be synchronized with the frame transfer timing. In the example of FIG. 10, a frame for which a frame transfer period Tf1 shorter than the gesture cycle Tj is set, and the shooting of which is started at time t1 and finished at time t2 lacks information on a blurred image from position P1 to position P3 of the gesture in the outward passage and the homeward passage. The information can obtain at time t3 at which shooting of the gesture in the second outward passage is finished. On the other hand, a frame for which a frame transfer period Tf2 equal to the gesture cycle Tj is set, and the shooting of which is started at time t1 and finished at time t4 contains information on the blurred image obtained by shooting a total extent of the gesture in the first homeward passage. Therefore, even if the frame transfer period Tf is set longer than the gesture cycle Tj, information more useful to add to a composite image than the information already obtained cannot be obtained, leading only to lengthening the time for recognition. Although there is no need to limit the invention, the maximum value of the frame transfer period Tf (the minimum value of the frame rate) can be so determined that the gesture cycle Tj will match the exposure time.

The present invention can also recognize the direction of the gesture to increase the number of commands. To this end, the gesture recognition application 201 recognizes which of a gesture starting from position P1 or a gesture starting from position P2 in FIG. 10 has been made. In this case, the maximum value of the frame transfer period Tf can be set to Tf<Tj/4 to recognize the gesture starting position.

When the frame transfer period Tf is set shorter, it is difficult to recognize the gesture in a dark place, increasing the power consumption of the system. Acceptable power consumption of the camera system differs from system to system. Therefore, the minimum value of the frame transfer period Tf can be determined for each system in consideration of these points. Since the parameters set in the camera module 100 to recognize a gesture depends on the performance of the camera system 10 such as the camera module 100 and the pattern recognition section 261, the photographing environment, the number of reference patterns, the allowable number of times of a gesture, and the like, the parameters can be determined by experiment for each camera system.

Next, the power saving function of the camera system 10 will be described. The frame rate of the camera module 100 is set low in the gesture mode. In the example of FIG. 4, the frame rate in the gesture mode is 5 fps, which is ⅙ of the frame rate of 30 fps in the video mode. As a result, the period of time during which the camera module 100 does not transfer any frame is increased to lengthen the period of time during which the camera module 100 is in the selective suspend state, reducing the power consumption.

Further, since the time for transferring data using the USB bus 50 becomes ⅙, the period of time during which the USB bus is in the idle state becomes long. In addition to the low frame rate in the gesture mode, when the reference patterns are limited to relatively simple several patterns, the load on the CPU 11 to perform pattern recognition is reduced, and this allows the CPU 11 to make a transition to a deeper sleep state. Thus, since the power consumption of the camera module 100, the USB bus 50, and the CPU 11 is reduced, the camera system 10 is suitable for applications requiring that a state of being able to shoot the motion of a moving object performed at unspecified timing is maintained over a long time with low power consumption.

F. Applications

Using the feature of being able to perform pattern recognition while standing by with low power consumption without being affected by such a photographing environment, the gesture recognition method according to the present invention can be applied to various applications. One application is to control the power state of an electronic device. In the case of a laptop PC, there is a case where the power consumption of a device in the idle state is reduced in power-on state (S0 state) specified by ACPI by implementing runtime idle detection or by employing a technique called S0 idle proposed by Microsoft®.

In detecting a runtime idle state, the CPU 11 transits between the active state and the sleep state periodically or in response to an interrupt while the LCD 17 and many other devices transit to a power saving state when the system is in the idle state. At this time, the camera system 10 operating in the gesture mode can recognize a gesture to wake up the system, or forcibly make the system transit to the idle state. The target to be recognized by the camera system 10 is not limited to a gesture as the motion of a part of the human body, and the present invention can be applied to all aspects of the motion of moving objects. For example, specific motion, such as the figure of an animal passing through a specific place, the motion of a machine, or a change in a natural environment, can be detected as a blurred image to issue a command in order to take a still image or moving image.

FIG. 8 shows the multiple reference patterns 281 to 287, but the number of reference patterns may also be one. In such a case, since the pattern recognition section 261 has only to be able to distinguish between noise blur and a blurred image of the gesture, the load on the CPU 11 to perform pattern recognition is further reduced. While the example of realizing the camera system 10 in the laptop PC has been described, the gesture recognition application 201 may be stored in the flash ROM 119 of the camera module 100 so that the MPU 115 will perform recognition and output a command. In such a case, the laptop PC 10 can also be woken up from the suspend state (S3 state) in which the power supply of the CPU 11 is turned off.

G. Another Method of Generating Composite Image

Figure 11:
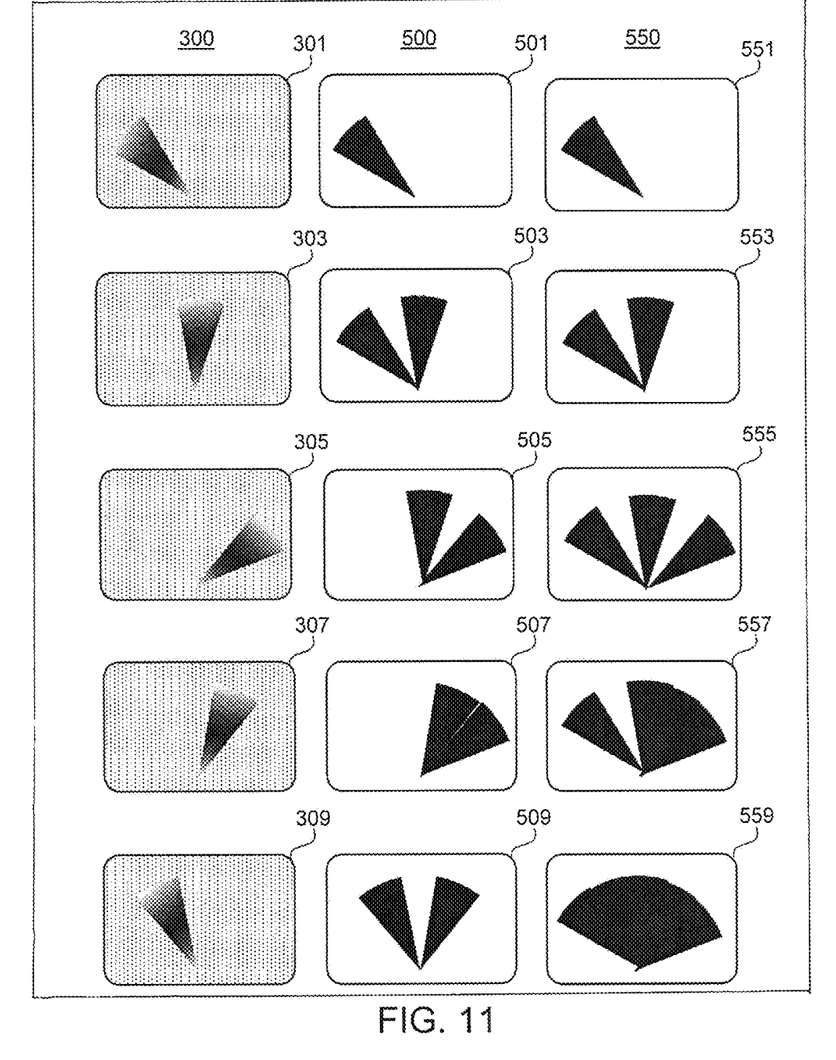
FIG. 11 is a diagram depicting an example of generating a differential image data group and a composite image data group from a frame sequence.

The example of generating the differential image group 350 and the composite image group 400 from the background image 291 and the frame sequence 300 is described above with reference to FIG. 9. The following will describe another method of generating a composite image with reference to FIG. 11. FIG. 11 shows the frame sequence 300 received at the interface section 251 like in FIG. 9, a differential image group 500 generated by the differential image generating section 257, and a composite image group 550 generated by the composite image generating section 259. The method in FIG. 11 does not require the background image generating section 253 and the background image storing section 255.

The differential image generating section 257 receives each of frames 301 to 309 in order to generate differential images 501 to 509. At this time, the differential image generating section 257 generates a differential image from two consecutive frames. For example, the differential image 501 is generated from the frame of the background image and the frame 301, and the differential image 503 is generated from the frame 301 and the frame 303.

The composite image generating section 259 calculates a logical sum of a differential image with the latest composite image repeatedly each time receiving each of the differential images 501 to 509 to generate composite images 551 to 559. In this method, there is no need to generate and update the background image, but a pixel area in which a blurred image of a frame with a shot of the gesture in the outward passage overlaps a blurred image of a frame with a shot of the gesture in the homeward passage cannot be extracted as a binarized blurred image. In this case, the exposure time can be lengthened so that recognition can be done from a one-way gesture, or the gesture cycle in the outward passage and the homeward passage can be changed.

As has been described, the present disclosure provides a method for recognizing motion gesture commands for controlling computer operations.

While the disclosure has been particularly shown and described with reference to a preferred embodiment, it will be understood by those skilled in the art that various changes in form and detail may be made therein without departing from the spirit and scope of the disclosure.

What is claimed is:
1. A method comprising:
receiving a plurality of consecutive frames of an object from an image sensor;
comparing a background image with a blur image included in each of said frames to determine a difference between gradation values of corresponding pixels;

generating a differential image and specifying a shape of a blur image corresponding to a reciprocating motion of said object from a synthesized image obtained by combining differential images;

comparing the shape of said reference pattern with the shape of said synthesized image;

and updating said background image when a portable computer detects an acceleration equal to or greater than a predetermined value.

2. The method of claim 1, wherein identifying a shape of said blurred image includes determining a logical OR of said difference images.

3. A method comprising:

defining a reference pattern with which a command is associated:

setting an exposure time of an image sensor mounted on a computer to capture a blur image drawn by a gesture;

receiving a plurality of consecutive frames obtained by photographing said gesture with said image sensor;

comparing a background image to a blur image included in each frame;

determining a difference between gradation values of corresponding pixels and binarizing a difference;

generating a difference image and specifying the shape of said blurred image of said gesture from a synthesized image obtained by synthesizing difference images;

sending said command to a computer when it is determined that the shape of said blur image matches said reference pattern;

and updating said background image when said computer detects an acceleration equal to or greater than a predetermined value.

4. The method of claim 3, comprising changing a power state of said computer in response to said command.

5. The method of claim 3, comprising activating a predetermined application program by said computer in response to said command.

6. The method of claim 3, wherein said shape of said reference pattern is a fan shape in which a blurred image is formed by a reciprocating motion of an arm around an elbow.

* * * * *